Dec. 21, 1954  S. ELOWSON ET AL  2,697,242
FOG REMOVAL DEVICE FOR SIGHT WINDOWS
Filed Feb. 15, 1951  2 Sheets-Sheet 1
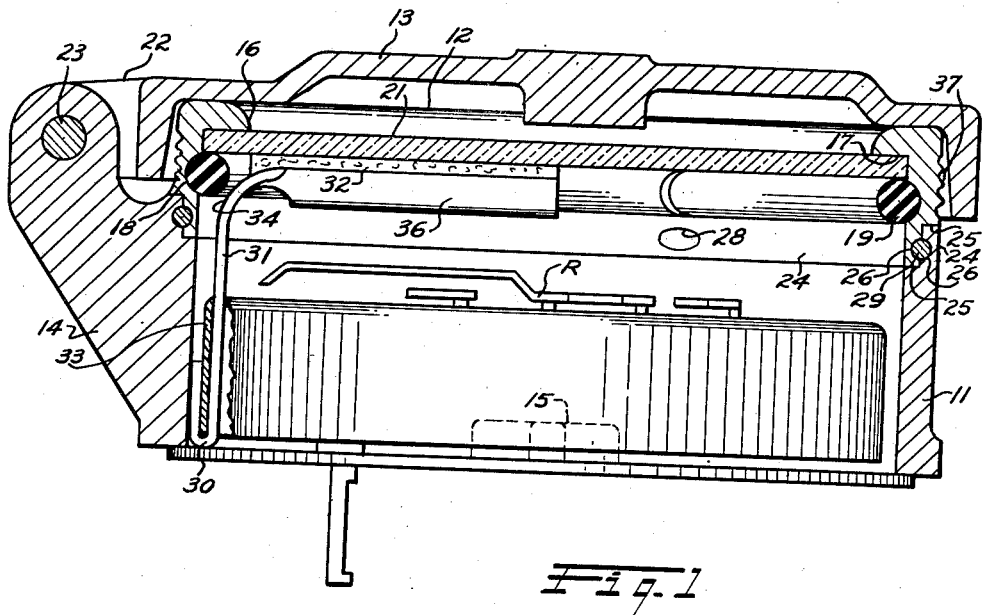
Fig. 1
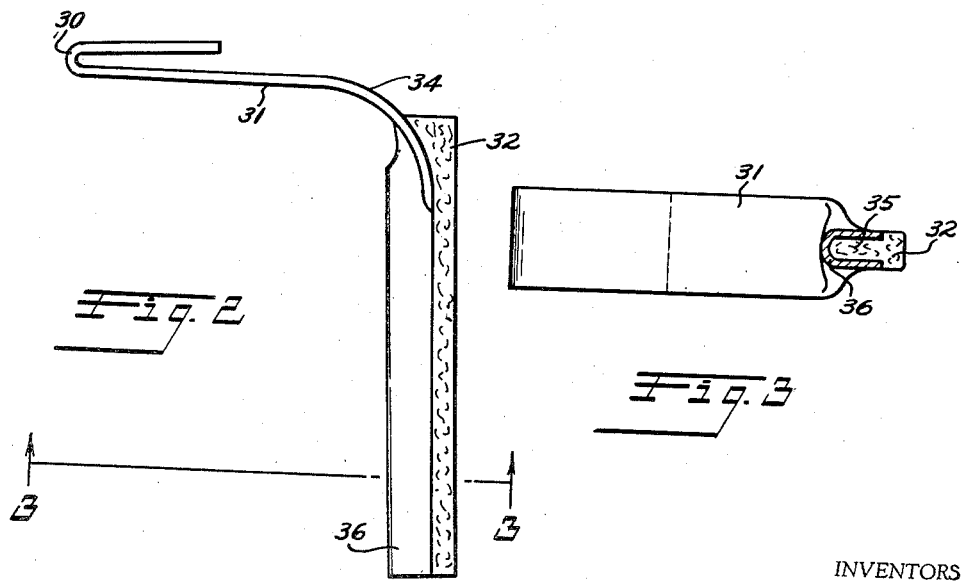
Fig. 2
Fig. 3
INVENTORS
STEN ELOWSON
GEORGE M. CAMPANELLA
BY Strauch, Nolan & Diggins
ATTORNEYS Dec. 21, 1954  S. ELOWSON ET AL  2,697,242
FOG REMOVAL DEVICE FOR SIGHT WINDOWS
Filed Feb. 15, 1951  2 Sheets-Sheet 2
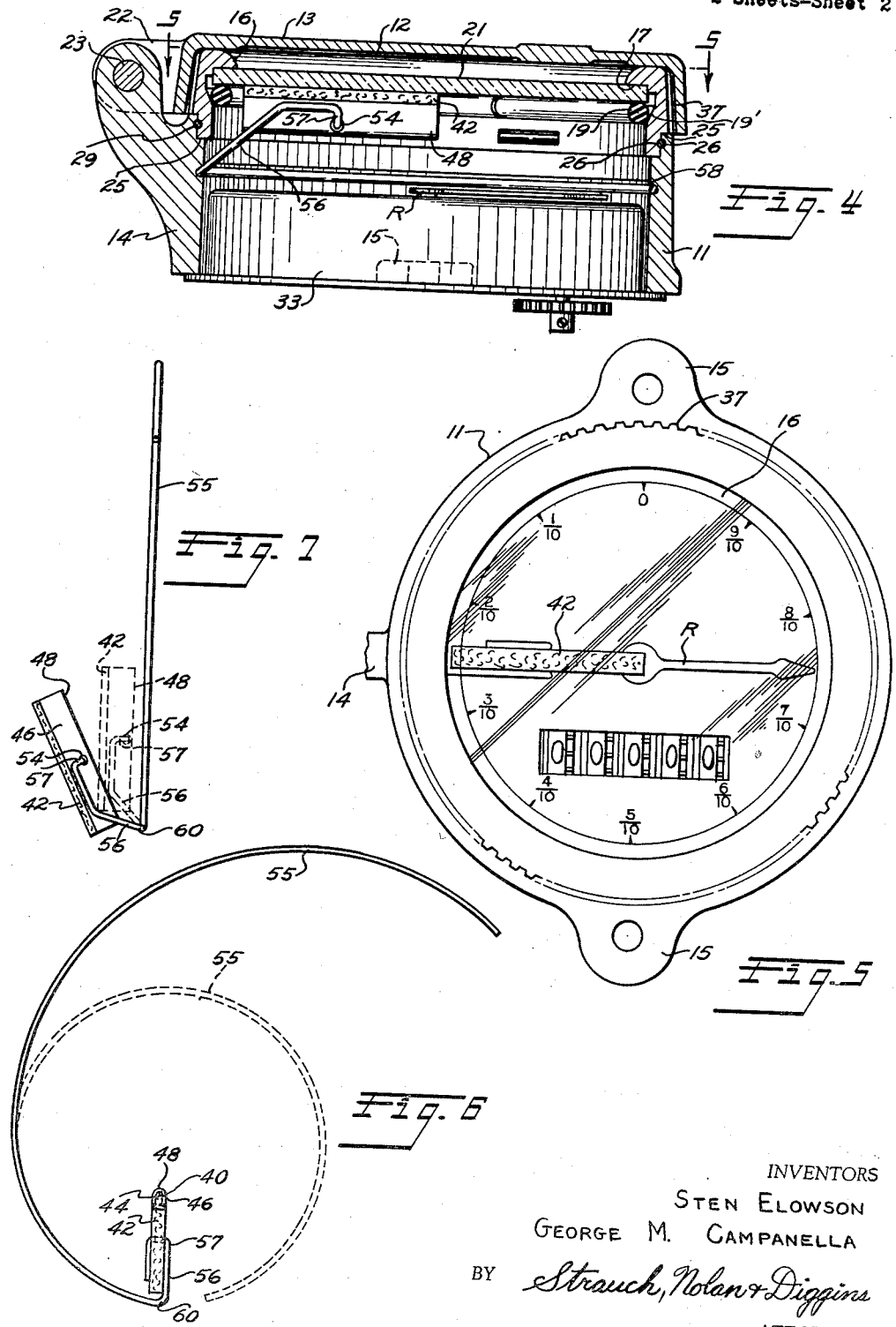
INVENTORS
STEN ELOWSON
GEORGE M. CAMPANELLA
BY Strauch, Nolan & Diggins
ATTORNEYS

United States Patent Office 2,697,242
Patented Dec. 21, 1954

---

2,697,242

FOG REMOVAL DEVICE FOR SIGHT WINDOWS

Sten Elowson and George M. Campanella, Brooklyn, N. Y., assignors to Rockwell Manufacturing Company, Pittsburgh, Pa., a corporation of Pennsylvania Application February 15, 1951, Serial No. 211,136

11 Claims. (Cl. 15—250)

This invention is generally related to window-wiping devices which are mounted in permanently associated relation to a window pane or glass and are operatively effective to remove from a surface of the glass accumulations of moisture, dust or other deposits which would more or less seriously impair unobstructed vision through the transparent window glass.

Generically considered, it is a prominent object of the present invention to provide a window-wiping device of this class in which the wiper element and glass are cooperatively assembled in a novel manner for the effective removal of condensed moisture or fog from the sight glass or window of a meter register, chronometer, ship's compass, test apparatus, or other instances where clarity of vision through the covering glass or indicator dial is an important requirement for the efficient and serviceable use of instruments or apparatus equipped with such devices.

In the use of fluid meter registers, with which the instant invention is more particularly concerned, under certain climatic conditions, notably in the Pacific Northwest, humidity is so high and condensation so rapid that a dense deposit of moisture or fog takes place on the underside of the window glass of the register, so that, unless removed, this substantially opaque moisture blanket, interposed between the glass and the register dial, seriously interferes with the accurate reading of said dial.

Various contrivances have been suggested for the purpose of cleaning or wiping accumulated moisture from a glass surface. Where the mechanism is readily accessible for adjustment, it may, without too much difficulty, be maintained in effective operating condition. However, in a meter register, the wiper element is enclosed within the register case, which is purposely made inaccessible from the exterior of the meter, to prevent tampering with the register mechanism by unauthorized persons. It is, therefore, another important object of this invention to provide a novel construction and mounting of the wiper element within the register case, which requires no adjustment of said element or the glass from their initially assembled relation to maintain the wiping contact between said element and glass surface indefinitely effective.

Prior register window wipers have usually been of either the radial pivoted type or the reciprocating type. In the former type, of which U. S. Patent No. 2,047,118 to W. F. Rockwell, for a "Register Box Window Wiper," is typical, the wiper arm is supported by a pivot member movable in a central opening in the glass window and provided with an external manually operable part, while in the latter type the reciprocal wiper arm also has a manually operable part extending through an opening in one side of the meter case. The principal practical objection to both of these types is the loss of tension of the wiper arm and the difficulty in maintaining effective wiping contact with the glass. Also, particularly in the radial arm type, the opening for the operating member results in the entrance of dirt and excessive moisture to the interior of the case. This construction is also expensive and liable to breakage in operation or shipment. In some instances, the wiper arm has been connected to the register mechanism for automatic operation. Of course, the wiper is actuated continuously while the meter is functioning, which is much more frequent than is necessary. Also, an additional variable load is imposed upon the meter, which, at a low rate of flow, may seriously impair the normal functional operation of the meter, while the accuracy of registration will be adversely affected by extraneous influences tending to impede or obstruct movement of the wiper.

Another type of known register window wiper is that in which a wiper is fixed within the register outer case or housing, and the window resiliently held above the wiper so that the window may be pressed into contact with the wiper and rotated to clean the glass. U. S. Patent No. 1,452,018 to M. O. Allen for "Cleaner for Meter Dial Guards" is typical of this type. The principal practical objections to devices of this type are that springs resiliently holding the glass window must be either too strong to permit rotation of the window easily or too weak to insure a dirt proof seal between the housing and the window; that the outer surface of the window will become soiled during the rotation of the window; and that there is an opening between the window and the housing during rotation of the window through which foreign matter will enter the housing.

Accordingly, it is a further object of the present invention to provide a window-wiping device for meter registers or the like, in which certain material practical improvements are embodied, whereby the above deficiencies of existing register window wipers are avoided, in a simple and rugged construction, positive and reliable in its operation, and which requires no unusual manual dexterity in its proper assembly with the meter register.

Another prominent object of the invention resides in the provision of novel means for connecting the window glass with an instrument case or other relatively fixed member for free relative rotation, together with a wiper arm of novel construction mounted beneath the glass in stationary tensioned contact with the glass surface, whereby the condensed moisture will be effectively removed from said surface in a single revolution of the window.

To the above end, in the disclosed examples of our invention, we provide a case embodying two sections, one of which carries the window glass, and a locking member easily and quickly applicable from the interior of the case and inaccessible from the exterior thereof, constructed and arranged to inseparably connect the case sections and permit free rotation of the glass carrying case section, while preventing malicious or fraudulent tampering with the instrument housed within the case.

A further object of the invention is to provide an improved mounting and arrangement of the several parts, whereby the interior of the case is substantially sealed against the entrance of fluid or other foreign matter.

A more specific object is the provision of means on one of the case sections, whereby the locking element between the case sections may be supplied with a permanent lubricating film.

It is an additional detail object of our invention to provide a wiper element of simple and novel construction embodying a resiliently yieldable arm adapted in one modification for attachement to a dust-ring inclosing the register mechanism and in the other modification for attachment to the internal portion of the case or housing, both modifications having means for the easy and quick attachment of an absorbent wiper strip to one end of said arm, which is automatically placed under the required tension when assembled within the register case.

With the above and other subordinate objects in view, the invention comprises the improved window-wiping device and the construction and arrangement of its several parts, as will hereinafter be more fully described, illustrated in the accompanying drawings, and subsequently incorporated in the subjoined claims.

In the drawings, wherein we have disclosed two simple, practical, and exemplary embodiments of our present invention, and in which similar reference characters designate corresponding parts throughout the several views:

Figure 1 is a vertical section on an enlarged scale showing a meter register case which we have selected for the purpose of illustrating one practical example of our invention, which will be hereinafter referred to as the first embodiment.

Figure 2 is a detached side elevation of the wiper element of the first embodiment.

Figure 3 is a transverse sectional view taken on the line 3—3 of Figure 2.

Figure 4 is a vertical section of a meter register case of a preferred construction which we have selected for the purpose of illustrating a second practical example of our invention which will be hereinafter referred to as the second embodiment.

Figure 5 is a sectional plan view of the second embodiment taken along the line 5—5 of Figure 4.

Figure 6 is a plan view of the wiper assembly of the second embodiment.

Figure 7 is a side elevation view of that wiper assembly.

Referring now the the first embodiment of our invention shown in Figures 1 to 3 of the drawings, and more particularly to Figure 1 thereof, 11 designates a body member, which, in the present instance, constitutes the bottom section of a case for a fluid meter register, generally indicated at R. With this bottom section of the case, a top section or frame 12, which carries the window glass through which the meter dial is read, is assembled in the manner to be presently described.

A cover member 13, which in its closed position extends over the case section 12 and protects the window glass against possible breakage and the accumulation of dirt on the outer surface thereof, is provided with spaced outwardly projecting perforated lugs 22 on its periphery, between which the perforated upper end of a bracket 14, formed on the wall of the case section 11, is received and pivotally supported thereon by means of the pin 23.

The body or bottom section 11 of the case is further provided with a plurality of outwardly projecting lugs 15 having bores to receive suitable attaching screws which are threaded into suitably tapped holes in lugs of the meter housing (not shown) to firmly secure said case section within a cup or recess formed on the top wall of the housing.

The window glass carrying frame or top section 12 of the meter case is provided at its upper edge with an inwardly extending annular flange 16, the lower surface of which provides a shoulder 17 for contact therewith of the marginal upper surface of the window 21. The wall of case section 12 below shoulder 17 is internally formed with an annular groove 18 to receive a split resilient ring 19, which has bearing contact with the lower surface of the window 21 at its perimeter and firmly holds the same in contact with the shoulder 17.

The lower edge of the top section 12 and the upper edge of bottom section 11 of the case are machined to form the lapped joint flanges 24 and shoulders 25, the opposed surfaces of the flanges having snug interfitting contact with each other. In these opposed surfaces of the joint flanges, the mating annular semicircular grooves 26 are formed and the inner joint flange 24 is provided with a short elongated slot or opening 28, which is in communication with the round circumferential channel formed by the grooves 26. Preferably, in the assembly of the case sections, a suitable lubricant, such as a waxy grease, is injected through opening 28 by means of a conventional pressure gun to completely fill the grooves 26. An annular split locking wire 29 is now threaded through opening 28 into the mating grooves 26. In this manner, the two case sections are securely locked together against relative axial movement, while the top window carrying section 12 of the case may be freely rotated on the bottom section 11. Such free and easy rotation of the case section 12 is greatly facilitated by the permanent lubricating film surrounding the locking wire 29. Of course, the lubricant will also extend between the opposed faces of the joint flanges 24 of the case section, and provide a substantially fluidtight seal preventing the entrance of moisture to the interior of the case.

The operating mechanism of the meter register R is enclosed by a circumscribing dust-ring 33, to which the window wiper element is preferably attached. As herein shown, this wiper element embodies an arm 31 of spring metal, such as brass. This arm at one end may be spot-welded or otherwise permanently secured to the wall of dust-ring 33, but as herein shown it is provided with a terminal bend or hook 30 which clamps upon the lower edge of the dust-ring 33. The attached end of the arm 31 extends above the dust-ring 33 in substantially parallel relation to the wall of case 11, and is connected by an intermediate portion 34, curved on a large radius arc, with the other free end portion of the arm, which is formed to provide an elongated channel-shape part 36 extending radially inward above the register dial and terminating in the vicinity of its center. In the channel part 36 of the wiper arm, the web portion 35, of a wiper strip or pad 32 is securely clamped between the side walls thereof. This wiper pad may be made of various materials, such as felt or the like. From reference to Figure 2 of the drawings, it will be noted that normally, before the register case is mounted upon the meter housing, the curved portion 34 of the spring metal arm 31 positions the wiper pad 32 at an angle somewhat greater than 90° with respect to the end of the arm attached to the register dust-ring 33 as shown in Figure 2.

From the above description, it will be understood that having first assembled the two case sections in the manner explained, the case is then applied over the meter register and secured to the top wall of the meter housing. In such application of the meter case, upon initial contact of the inner end of wiper pad 32 with the lower surface of the transparent window 21, the pad is forced downwardly, thereby automatically placing the curved section 34 of the resilient wiper arm under the required tension to urge the pad 32 upwardly, and maintain uniform pressure contact of said pad throughout its length with the lower surface of the window glass. For convenience in rotating or turning the upper window-carrying section of the case relative to the wiper pad, the cylindrical wall thereof may be externally milled or knurled as indicated at 37. A single revolution of the top section of the case is sufficient for the stationary wiper pad 32 to effectively remove from the lower surface of the window any condensed moisture or fog which may have accumulated thereon, so that visibility of the dial of the register mechanism through the transparent window will be restored. The wiper pad 32 is so located radially of the register dial that it will not obstruct or interfere with the quick and accurate reading thereof. By the provision of the stationary wiper element, the window glass remains intact and is not subject to strains or stresses such as are incident to the pivotal mounting of the wiper arm in the glass, as heretofore provided. It will also be noted that since the locking wire 29 and the attaching means for the register case are inaccessible from the exterior of the case, fraudulent tampering with the register mechanism is effectively prevented.

Referring now to the second embodiment of our invention shown in detail in Figures 4 to 7 of the drawings, and more particularly to Figure 4 thereof, it will be noted that the meter case construction is quite similar to that of the first embodiment. As in the first embodiment a cover member 13, which, in its closed position, extends over the case section 12 and protects the window glass 21 against possible breakage and the accumulation of dirt on the outer surface thereof, is pivotally mounted by a pin 23 on the bracket 14 forming an integral part of the lower portion 11 of the case. The window glass 21 is supported within the upper section of the case 12 by a resilient split ring 19 coacting with the annular groove 18 to hold the window glass 21 against the inwardly extending annular flange 16, which forms a part of the upper section 12 of the meter case. The upper section 12 of the meter case is inseparably mounted for rotation relative to the lower portion 11 of the meter case by the coaction of the mating annular semicircular grooves 26 with the locking wire 29, as was previously described in detail in reference to the first embodiment.

The second embodiment differs from the first embodiment in detail in the construction of the wiper assembly and in the supporting means therefor. Referring now to Figures 6 and 7, the web portion 40 of the wiper pad 42 is held securely between the sides 44 and 46 of a channel shaped member 48. Aligned holes 54 are centrally located in each side 44 and 46 of the channel member 48.

In this embodiment, the wiper assembly supporting means is a spring wire which is formed to have an arcuate portion 55 and an inwardly extending radial portion 56. The wiper assembly is pivotally mounted on its supporting means by passing the hooked end 57 of the radial portion 56 through the aligned holes 54 in the sides 44 and 46 of the channel member 48. In Figures 6 and 7, the normal shape of the spring wire when disassembled from the meter case has been shown in full lines, while the shape of the spring wire when it is assembled within the meter case has been shown by phantom lines. In Figure 6, it is seen that the arcuate portion 55 of the spring wire is compressed to be substantially circular in shape when assembled within the case.

The radial portion 56 is formed to extend radially inward from the periphery of the arcuate portion 55 and upward from the plane of the arcuate portion 55. In Figure 7, it is seen that when assembled within the casing the radial portion 56 of the spring wire will be pressed downward relative to the arcuate or circular portion 55 to assume the position indicated by phantom lines in that figure. It will be noted that in assembly it is unnecessary to bend any part of the wire structure, and that it may readily be inserted in position to avoid interference with easy reading of the meter. Referring now to Figure 4, an annular groove 58 is formed on the inner surface of the lower portion 11 of the casing below the rotary connection between the lower section 11 and the upper section 12 of the casing. When the wiper assembly and supporting means are assembled within the casing, the arcuate portion 55 is allowed to expand into this groove 58 thereby positioning the supporting means and wiper assembly. As the wiper assembly and supporting means are inserted, the wiper pad 42 will engage the lower surface of the window 21 so that, as assembly continues, the radial portion 56 becomes compressed relative to the plane of the arcuate portion 55 to produce torsional stresses within the arcuate portion of the spring wire adjacent the junction 60 of the arcuate 55 and radial 56 portions of the spring wire. Due to these torsional stresses, a centrally located force is applied to the wiper assembly through hooked end 57, so that the wiper pad 42 is pressed against the lower side of the window 21 with uniformly distributed pressure.

In the second modification, we have disclosed a wiper assembly and support therefor comprising a minimum number of parts which is very easily assembled and in which the contact pressure between the window glass 21 and the wiper pad 42 is uniformly distributed over the contacting surfaces.

From the foregoing, it will be appreciated that we have provided improved window-wiping devices of simple, inexpensive and durable construction, which are admirably adapted for use in connection with meter registers, chronometers, and analogous instruments, and which require no adjustments of any kind to maintain the same in permanently effective operating condition. However, it will also be understood that our invention may be usefully employed in connection with peep-holes or the sight-openings of test apparatus where the transparency of the sight-glass or window might be obscured by the deposit of moisture, dust or other foreign matter upon the surface thereof.

This application is a continuation-in-part of our co-pending application Serial No. 679,057, filed June 25, 1946, for a Fog Removal Device which has since been abandoned.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a fixed hollow body member, a frame and a transparent window carried thereby, means coupling said frame to said body member for free rotation in the plane of said window comprising a lapped flange joint between the body member and frame having mating annular grooves in the joint flanges and an opening in one of the flanges, together with a split locking ring insertable into said grooves from the interior of said body member through said opening, and a relatively stationary wiper assembly mounted within said body member comprising a wiper pad in contact with the inner surface of said window and a resilient support for said pad within said body member adapted to urge said pad into contact with said inner surface of the window.

2. In combination, a fixed hollow body member, a frame and a transparent window carried thereby, means coupling the frame to said body member for free rotation in the plane of the window comprising a lapped flange joint between the body member and frame and a locking ring inseparably connecting said joint flanges, one of the flanges having an opening for the introduction between the joint flanges of a lubricant film for said locking ring, and a relatively stationary wiper assembly mounted within said body member comprising a wiper pad in contact with the inner surface of said window and a resilient support for said pad adapted to urge said pad into contact with said inner surface of said window.

3. In an instrument having an indicator dial mounted within a casing and visible through an aperture in said casing, a cover glass support comprising a member mounted on said casing over said aperture for free rotation, a transparent window in said member having a substantially planar bottom surface normal to the axis of rotation of said member, coacting means between the window and member for fastening said window securely upon said member, said rotary mounting between the casing and member being constructed and arranged to prevent separation of said casing and member in the direction of said axis, and a wiper assembly mounted within said casing comprising a window contacting blade and means fixed relative to said casing mounting said blade, constantly resiliently urging it into contact with the inner surface of said window, and holding said blade against movement with said window when the latter is rotated, so that rotation of said cover glass support will result in cleaning of the bottom surface of said window by the relatively stationary wiper blade.

4. In the instrument defined in claim 3, said blade mounting means being fixed relative to the inner wall of said casing below the rotary mounting between the casing and the cover glass support and projecting radially inward above the dial.

5. In the instrument defined in claim 3, said rotary mounting between said member and casing comprising circumferential surfaces fitting one within the other, with coextensive annular grooves in said surfaces, and an annular locking element bridging said grooves.

6. In the instrument defined in claim 5, a slot in the inner wall of said casing opening into said grooves for insertion of said element.

7. In combination, a fixed hollow body member, a frame and a window carried thereby, means coupling said frame to said body member for free rotation in the plane of said window, comprising a lapped flange joint between the body member and frame having mating annular grooves in the joint flanges and an opening in one of said flanges, together with a split locking ring insertable into said grooves from the interior of the body member through said opening, and a relatively stationary wiper element mounted within said body member comprising a wiper pad and a resiliently yieldable support for said pad automatically tensioned by contact of the window therewith and urging the opposed surface of the pad into substantially uniform pressure contact with the inner surface of said window in the rotation of said frame.

8. In combination, a fixed hollow body member, a frame and a window carried thereby, means coupling said frame to said body member for free rotation in the plane of said window, comprising a lapped flange joint and a locking ring inseparably connecting the joint flanges, one of said flanges having an opening for the introduction between the joint flanges of a lubricant film encasing said locking ring, and a stationary wiper element mounted within said body member comprising a wiper pad and a resiliently yieldable support for said pad automatically tensioned by contact of the window therewith and urging the opposed surface of the pad into uniform pressure contact with the inner surface of said window in the rotation of said frame.

9. In an instrument, a casing, a window glass frame mounted for free rotation upon said casing about an axis and held against displacement in the direction of said axis, a window glass fixed in said frame and having a flat surface facing interiorly of said casing, an internal annular wall groove in said casing, a wiper blade in contact with said window glass surface, and a torsion spring supporting said blade and resiliently urging it against said window glass surface comprising a length of spring wire having an end portion confined in said groove and an arm extending angularly from said portion in said groove pivotally connected to said blade.

10. In an instrument, a casing, a frame mounted on said casing for free rotation about an axis and held against displacement in the direction of said axis, a transparent window fixed upon said frame, a relatively stationary wiper blade disposed within said casing, and means for mounting said blade on the casing and constantly resiliently urging it against the underside of said window comprising a length of spring wire having an arcuate portion seated on said casing inwardly of said frame and held against displacement longitudinally of said casing and an integral arm extending angularly from said arcuate portion toward said window, and means connecting said arm to said blade, said arm being bent toward said arcuate portion in the assembly whereby the length of wire functions as an energized torsion spring tending to urge said blade against the underside of said window.

11. In an instrument, a casing, a frame mounted on said casing for free rotation about an axis and held against displacement in the direction of said axis, a transparent window fixed upon said frame, a relatively stationary wiper blade disposed within said casing, and means for mounting said blade on the casing and constantly resiliently urging it against the underside of the window comprising a peripheral groove in the inner wall of said casing, a length of spring wire having one end coiled and confined in said groove wherein it is positively seated due to its tendency to uncoil toward a normally unstressed condition and an arm extending angularly from said coiled portion toward said window and connected to said wiper blade, said arm being bent toward said coiled portion when assembled in the casing thereby stressing the spring wire so that said wiper blade is resiliently urged thereby against said window.

References Cited in the file of this patent

UNITED STATES PATENTS

| Number | Name | Date |
|---|---|---|
| 1,097,449 | Ledlow | May 19, 1914 |
| 1,452,018 | Allen | Apr. 17, 1923 |
| 2,047,118 | Rockwell | July 7, 1936 |
| 2,119,423 | Defibaugh | May 31, 1938 |

FOREIGN PATENTS

| Number | Country | Date |
|---|---|---|
| 346,143 | Great Britain | of 1931 |